(12) United States Patent
Urano et al.

(10) Patent No.: US 6,360,839 B1
(45) Date of Patent: Mar. 26, 2002

(54) COOLING DEVICE FOR MOTORCYCLE

(75) Inventors: Naoki Urano; Hiroshi Inokawa, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,424

(22) Filed: Sep. 5, 2000

(30) Foreign Application Priority Data

Sep. 5, 1999 (JP) .............................. 11-291430

(51) Int. Cl.[7] .............................. B60K 11/04; B62M 7/02
(52) U.S. Cl. ..................... 180/229; 280/219; 280/68.6; 280/69.1
(58) Field of Search .................... 180/219–229, 180/230, 68.6, 68.4, 84, 69.1; 165/41, 44; 280/152.1, 153.3, 159, 852, 851, 847, 848; 296/199

(56) References Cited

U.S. PATENT DOCUMENTS

| 4,621,680 A | * | 11/1986 | Funabashi | 165/44 |
| 4,685,530 A | * | 8/1987 | Hara | 180/219 |
| 4,953,631 A | * | 9/1990 | Kimura | 180/229 |
| 5,176,111 A | * | 1/1993 | Nakamura et al. | 123/41.01 |
| 5,211,256 A | * | 5/1993 | Muramatsu | 180/219 |
| 5,307,865 A | * | 5/1994 | Inagaki et al. | 165/41 |
| 5,566,746 A | * | 10/1996 | Reise | 165/41 |

FOREIGN PATENT DOCUMENTS

JP            A59995       3/1993

* cited by examiner

Primary Examiner—Anne Marie Boehler (57) ABSTRACT

A cooling device is efficiently arranged which simplifies and reduces the weight of piping for the cooling device by shortening the piping. A cooling water pump is arranged on a vertically elongated skid plate at one side of a crankcase. A reservoir tank is located on the other side of the crankcase. The reservoir tank is formed of synthetic resin or similar material. The reservoir tank is housed in a space between the skid plate and a front section of an ACG case of the reservoir tank.

20 Claims, 7 Drawing Sheets

COOLING DEVICE FOR MOTORCYCLE

BACKGROUND OF THE INVENTION

1. Field of the Invention

The present invention relates to a cooling device for a motorcycle, and particularly to a beneficial arrangement of a cooling water pump and a reservoir tank.

2. Description of the Background Art

Japanese Utility Model No. Hei. 5-9995 discloses a motorcycle provided with a skid plate for covering the top and front of a crankcase, and having a pair of left and right water tanks mounted above the skid plate on either side of the crankcase.

A reservoir tank of a motorcycle is a comparatively large and heavy component, and is usually arranged on the side of a rear fender of the vehicle. However, if this is done, it is not possible to check the amount of water while traveling. Also, piping from a radiator is long and is therefore complicated and heavy. In addition, with respect to vehicle layout, the area occupied by the reservoir tank is large which means it is difficult to ensure sufficient piping space. Furthermore, it is difficult to concentrate the mass because the reservoir tanks are arranged away from the center of gravity. Finally, since there are large variations in the posture of the vehicle at comparatively high positions of the vehicle, leakage is likely to occur.

With the above described related art, by using a skid plate, it is possible to make effective use of dead space. However, this water tank is comparatively rigid and since it is intended to be useful as a protection member for the crankcase and as a storage space for drinking water, it will soon become empty and capacity variations are substantial. The object of this invention is to solve the above described problems.

SUMMARY OF THE INVENTION

In order to solve the above described problems, the cooling device of the present invention is for a motorcycle with an engine arranged between front and rear wheels, with the lower part of the engine being covered by a shield plate. The engine includes a crankcase at a lower portion thereof, and a cylinder head projecting outward from the top of the crankcase. A cooling water pump for circulating cooling water for the engine is arranged on one side of the crankcase. A reservoir tank for cooling water is arranged close to the other side. At least front parts of the cooling water pump and the reservoir tank are covered by a skid plate.

A skid plate is used, and the cooling water pump and the reservoir tank are arranged so as to be on either side of the crankcase above the skid plate. As a result, piping for respective radiators can be shortened, and it is possible to prevent weight increase by simplifying the piping. Also, by providing the cooling water pump and the reservoir tank above the skid plate, they can be arranged at the lowest position where there are relatively few changes in attitude of the vehicle, which means that leakage can be reduced. Also, even if they are made of a resin material having comparatively low rigidity, it is possible to anticipate protection using the skid plate and to make effective use of dead space.

Also, since the reservoir tank usually maintains an almost constant volume, fluctuation in liquid amount is slight. Further, by arranging the tanks close to the crankcase, the mass can be concentrated promoting a low center of gravity, and a change in the center of gravity is slight. Finally, it is possible to check the liquid amount at any time while traveling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

An embodiment of the frame structure according to this invention will be explained by referring to the accompanying drawings. First, the general structure of a vehicle body will be outlined by referring to FIG. 1. The motorcycle is of the off-road type. A head pipe 2 is mounted at the front end part of a vehicle frame 1. A front fork 3 is rotatably supported on the head pipe 2, and is steered by a handlebar 4. A front wheel 5 is supported on the lower end portion of the front fork 3, along with a front wheel brake system including a brake disk 6 and a brake caliper 7.

Figure 1:
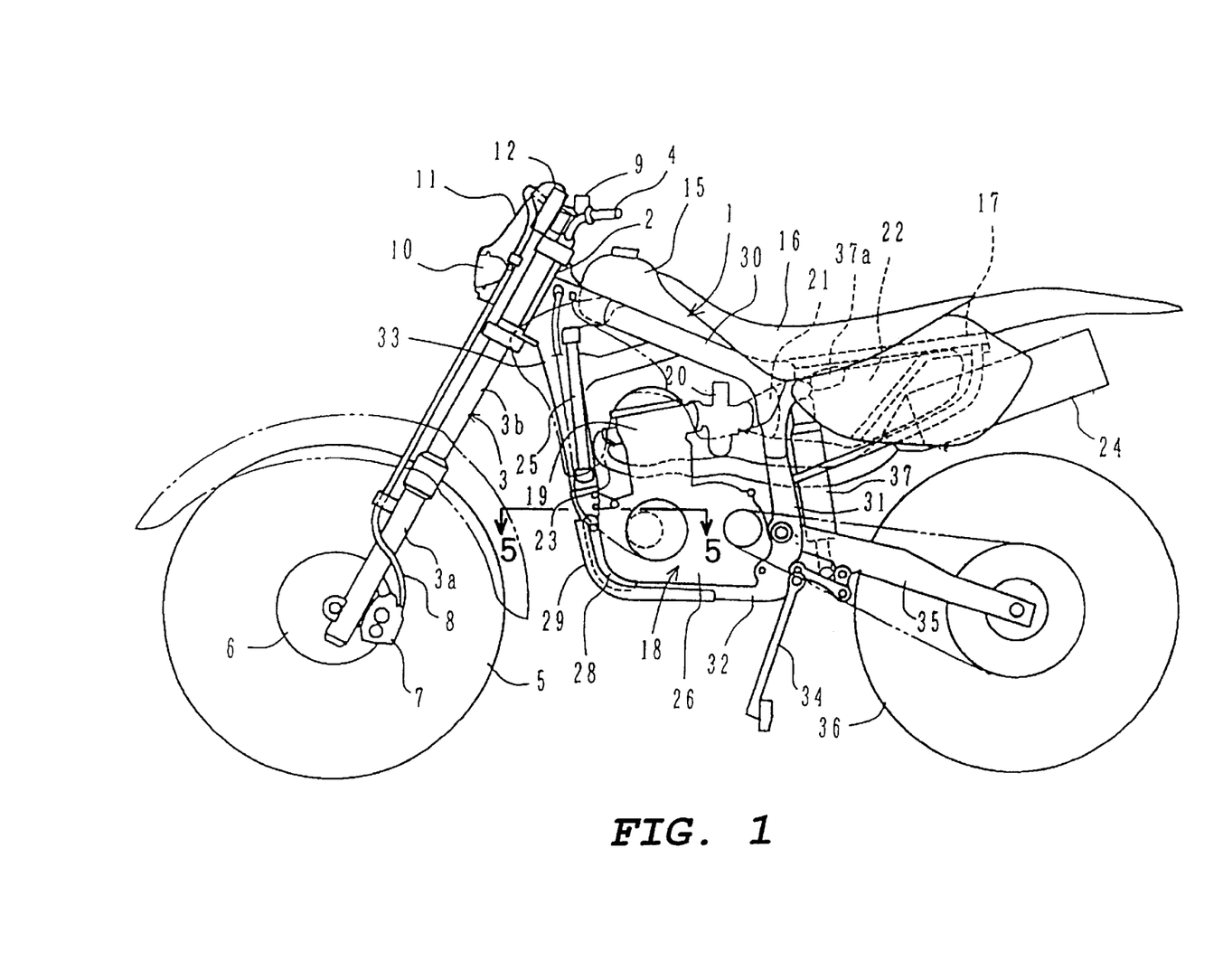
FIG. 1 is an overall side elevation of a motorcycle to which the embodiment is applied.

One end of a brake hose 8 is connected to the brake caliper 7, and the other end is connected to a master cylinder 9 located in the vicinity of a brake lever (not shown) of the handlebar 4. The intermediate portion of the brake hose 8 is installed nearly along the front fork 3. Reference numeral 3a denotes an outer tube of the front fork 3, and reference numeral 3b denotes an inner tube. The motorcycle also includes a headlight 10, a light case 11 (small front cover) serving also as a number plate, and a dashboard 12.

A fuel tank 15 is supported on the upper surface of the vehicle frame 1. A seat 16 is mounted beside the fuel tank 15. The seat 16 is supported on a seat rail 17 extending toward the rear from the rear shoulder portion of the vehicle frame 1. The vehicle frame 1 is loop-shaped as viewed from the side, and supports a water-cooled engine 18. The intake port of the water-cooled engine 18 is connected to a carburetor 20 from the rear of a cylinder 19. The carburetor 20 is connected to an air cleaner 22 located below the seat through a connecting tube 21.

An exhaust pipe 23 is connected at the front end portion to the exhaust port of the cylinder 19. The exhaust pipe extends forward and is bent at a steep angle, then extends rearward on the same side, but apart on upper and lower sides, and finally is connected to a muffler 24 at the rear of the vehicle body.

The cooling system is located at the front of the cylinder 19. The cooling water is supplied from a radiator 25 supported on the vehicle frame 1 into a water pump (not shown) located in a crankcase 26 of the water-cooled engine 18. The cooling water is sent from the water pump into the engine 18, and cools the cylinder 19. A reservoir tank 28 is mounted between the crankcase 26 and a skid plate 29 which is attached to the vehicle frame 1.

The front side of the vehicle frame 1 is comprised, in a loop form, of a main pipe 30, a pivot frame 31, a lower frame 32, and a front down pipe 33. A front end of a swing arm 35 is pivotally supported on the pivot frame 31. A rear wheel 36 is supported on the rear end of this swing arm 35. One end of a rear cushion unit 37 is attached to an intermediate portion of the swing arm 35 via a link, and the other end of the rear cushion unit 37 extends upwardly to be supported on the pivot frame 31.

A reservoir tank 37a is mounted on the upper end section of the rear cushion unit 37. The reservoir tank 37a is mounted on the opposite side of the connecting tube 21 of the vehicle body and the exhaust tube 23, protruding to a position in which the passage of the exhaust pipe 23 is prevented. A side stand 34 is pivotally mounted on the lower end portion of the pivot frame 31.

In the lubrication system, a part of the vehicle frame serves as an oil tank built into the frame, which supplies the oil to the oil pump of the crankcase 26.

Figure 2:
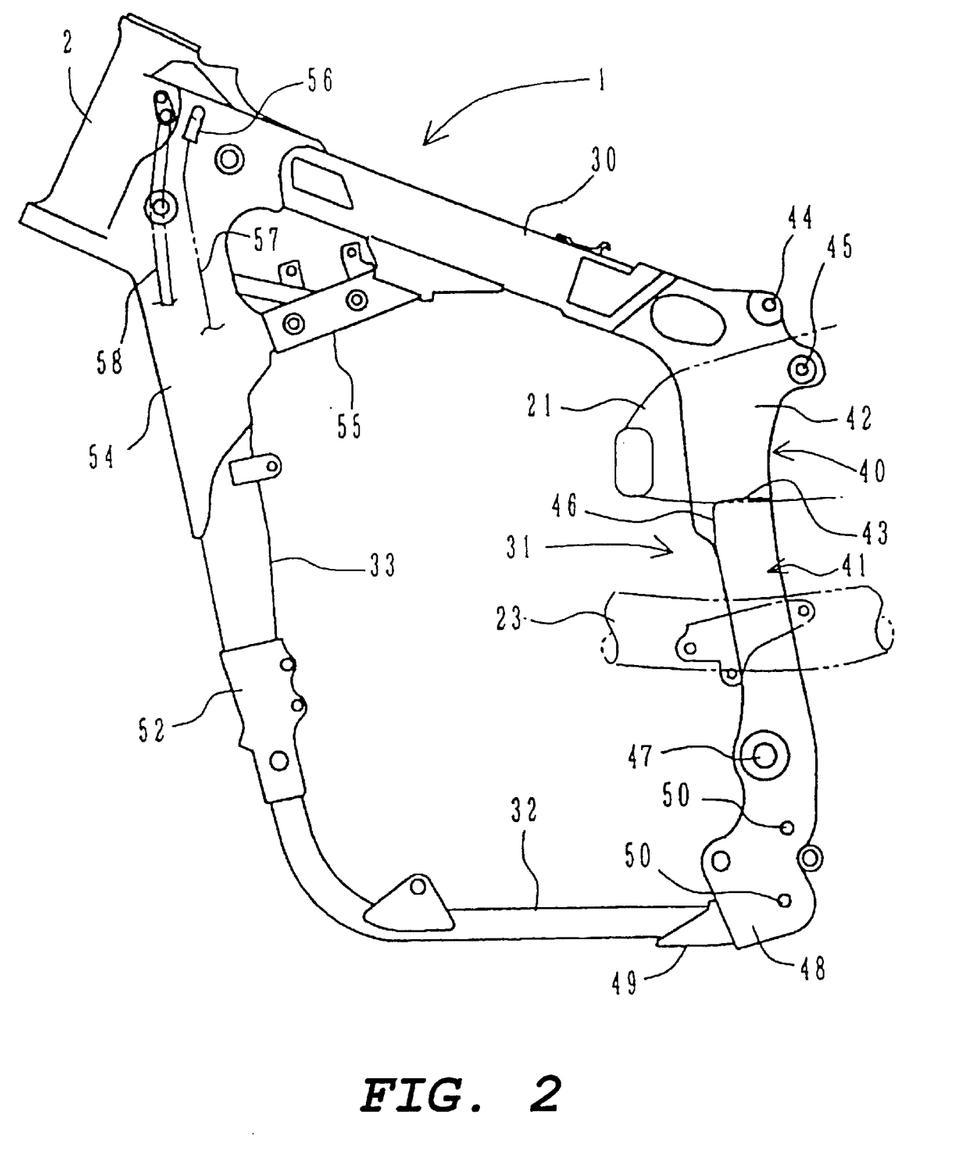
FIG. 2 is a side elevation of a vehicle frame of the motorcycle.
Figure 3:
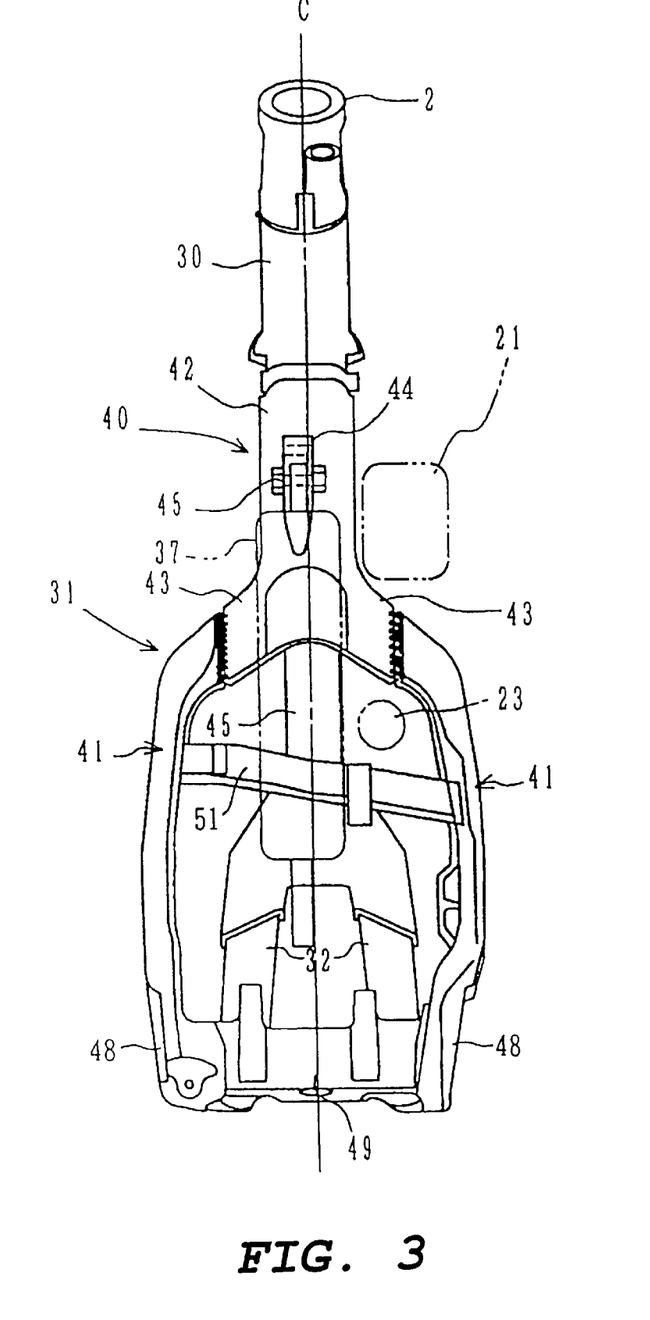
FIG. 3 is a rear view of the motorcycle.

Next, the vehicle frame 1 will be explained in detail. FIG. 2 is a side view showing the vehicle frame 1, and FIG. 3 is a rear view thereof. As is clear from these drawings, the vehicle frame 1 is a single pipe member installed along the center of the vehicle body. The pivot frame 31 is separated into an upper cross member 40 on the upper half side and a pivot plate portion 41 on the lower half side. The pivot plate 41 includes a pair of right and left members.

The upper cross member 40 is a forging or cast component, which has a neck portion 42 extending up and down along the center of the vehicle body and welded at the upper end thereof to the rear end portion of the main pipe 30. The upper cross member 40 also has an arm portion 43 branched off and projecting to right and left sides at the lower end. At the rear part of the neck portion 42, a mounting boss 44 of the seat rail 17 and a mounting boss 45 at the upper end of the rear cushion unit 37 located beneath the mounting boss 44 are integrally formed as one body.

The pivot plate portion 41 is a forging or cast component having many ribs formed on the inside surface. The upper end 46 thereof is fitted into the arm portion 43 and lap-welded together. A pivot portion 47 is provided in the intermediate portion of the pivot plate portion 41 to support the swing arm 35 on a bearing. The lower end portion 48 is fitted sideways into the lower cross member 49 and is welded.

Holes 50 for mounting the stand bracket are formed in the side of the lower end portion 48. The lower cross member 49 connects a pair of lower frames 32, right and left, at the rear ends as shown in FIG. 3. A cross plate 51 is mounted above the lower cross member 49 for obliquely connecting the intermediate portions of the right and left pivot plate members 41.

The rear cushion unit 37, as shown in FIG. 3, is mounted in a vertical direction, being supported at the upper end on a mounting boss 45. The center of the rear cushion unit 37 is deviated leftward from the centerline C in the vertical direction of the vehicle body.

Figure 4:
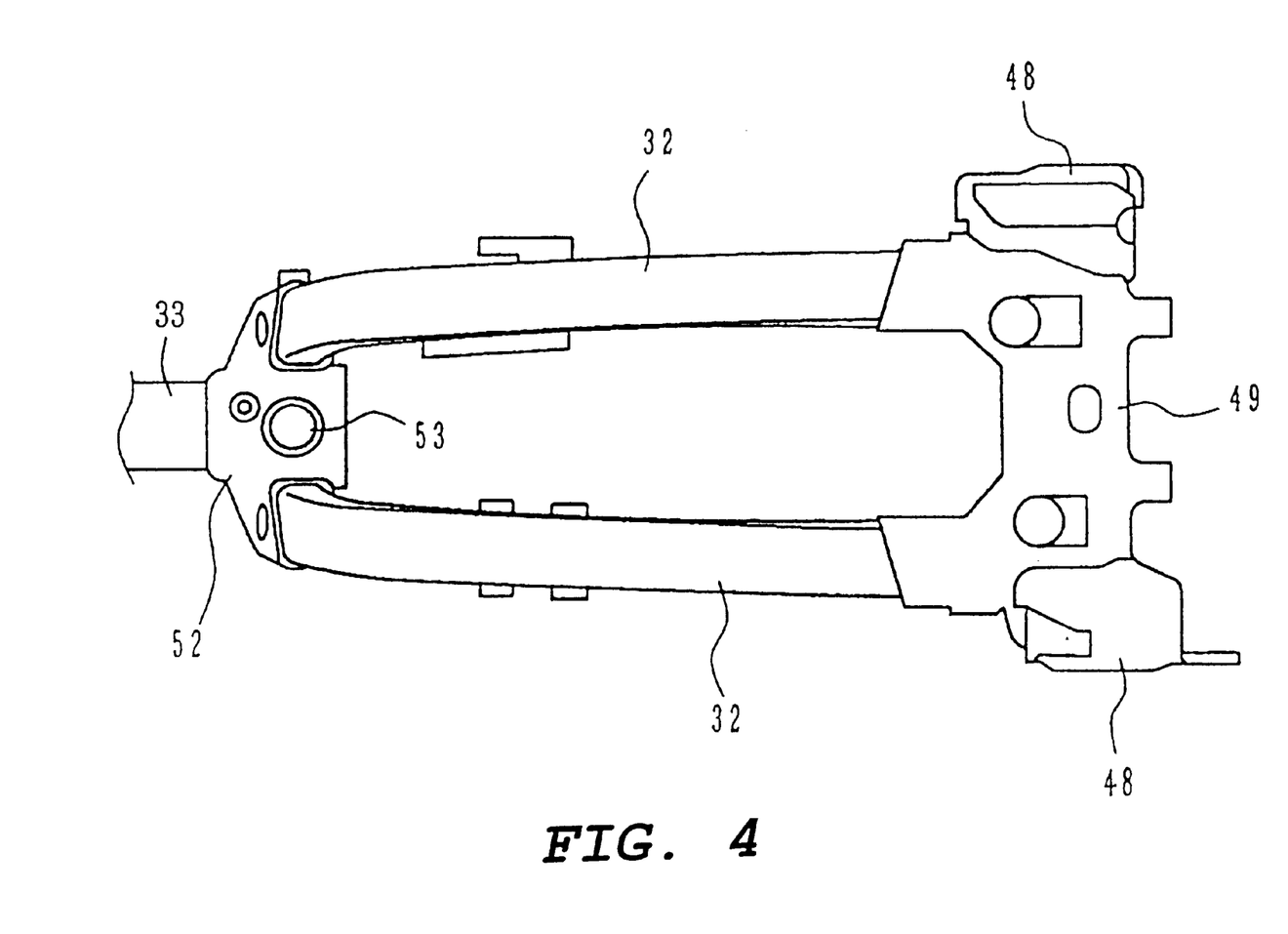
FIG. 4 is a bottom view of the motorcycle.

FIG. 4 is a bottom view of the lower frame 32, which is connected at the rear end by the lower cross member 49. The lower frame 32 is narrow at the front end, being connected to a joint member 52 provided at the lower end of the front down pipe 33. The joint member 52 is a member bifurcated at the lower part, where a drain hole 53 is provided.

The joint member 52 serves as a member for closing the lower end of the front down pipe 33, which functions also as the built-in oil tank. As shown in FIG. 2, the front down pipe 33 forms a tank section 54 made of an aluminum alloy having high thermal conductivity and cast unitarily with the head pipe 2. A reinforcing pipe 55 is connected at the rear part of the tank section 54 and to the main pipe 30.

A breather pipe 56 is installed in the connecting part between the upper portion of the head pipe 2 and the front end of the main pipe 30. The breather pipe 56 is connected to the upper portion of the cylinder 19 by a breather tube 57. An oil return port is provided in the vicinity thereof to which an oil return pipe 58 from the oil pump in the lower part of the crankcase 26 is connected.

Figure 5:
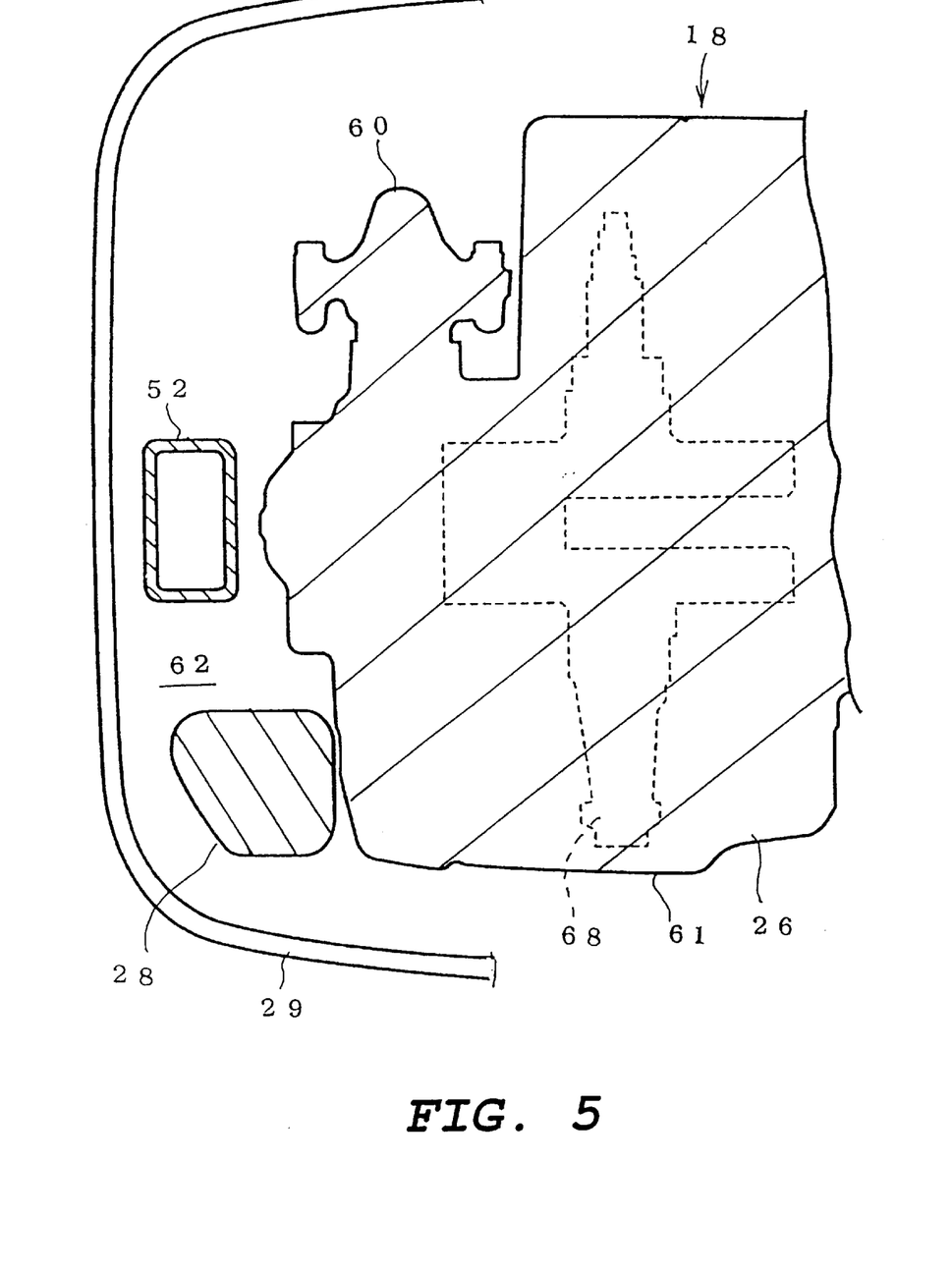
FIG. 5 is a cross sectional view along line 5—5 in FIG. 1.

The arrangement of the reservoir tank 28 will now be described with reference to FIG. 5. The crankcase 26 of the water cooled engine 18 is fitted between inner sides at the front of the skid plate 29. A cooling water pump 60 is arranged at one side (on the right side of the vehicle in this example) and is connected to a water supply port at a lower end of the radiator 25 by a jet hose (not shown). Cooling water is circulated so as to be supplied to a water jacket of the cylinder 19 and returned to the radiator 25 after cooling the cylinder 19.

Figure 6:
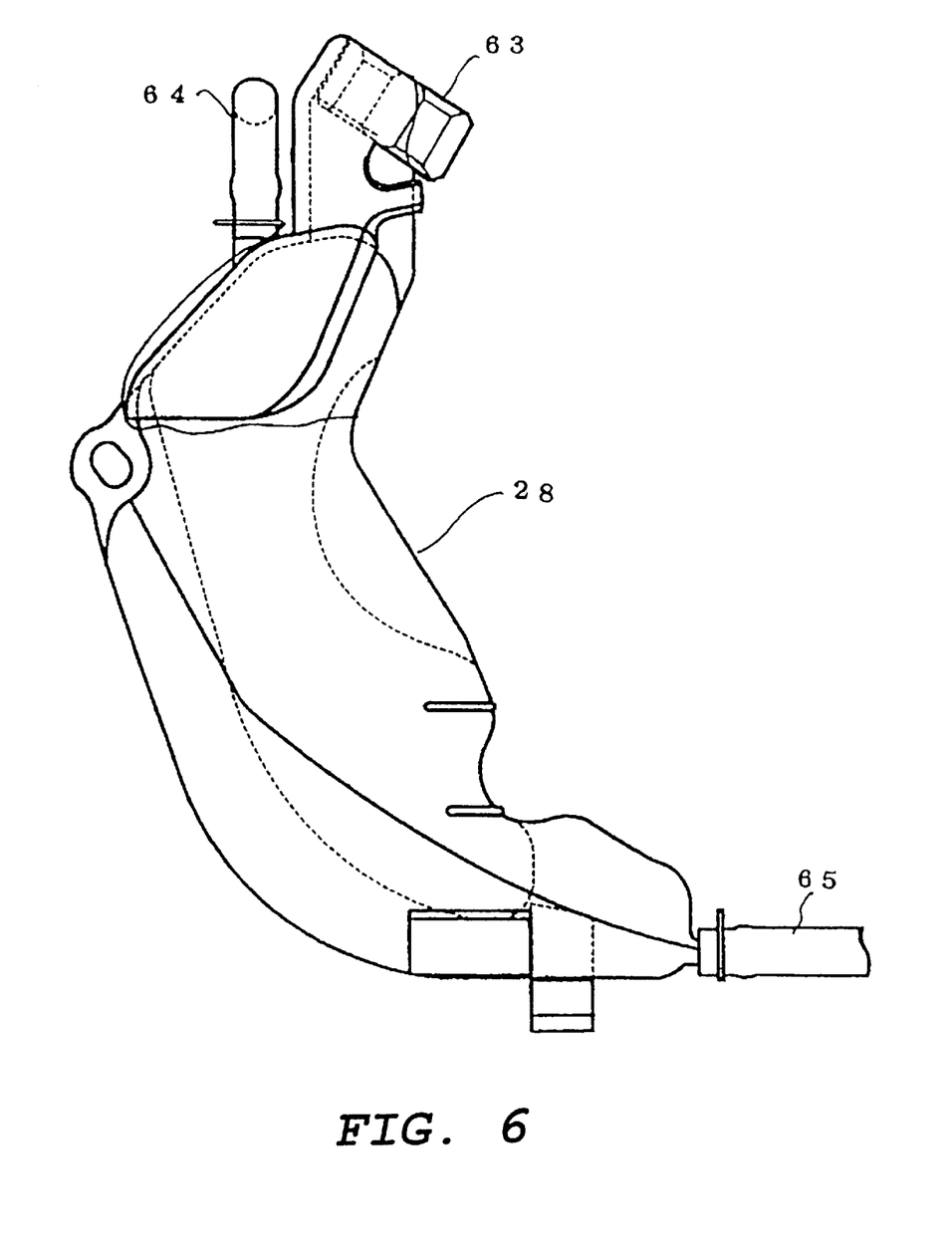
FIG. 6 is a side elevation of a reservoir tank.

An ACG case 61 projects out to the side at the other side (the left side of the vehicle in this embodiment) of the crankcase 26, and a reservior tank 28 is arranged inside a space formed between a front surface of the ACG case 61 and an inner surface of the skid plate 29. The reservior tank 28 is a transparent or semitransparent member formed using a suitable synthetic resin material, and as shown in FIG. 6, is formed in a vertically elongated shape so as to fit into the space 62. A cap 63 and an overflow pipe 64 are provided at an upper end. The lower end curves and extends in a longitudinal direction and overlaps a flat section of the skid plate 29. A reservoir tube 65 for connection to the radiator 25 extends from a rear end.

Figure 7:
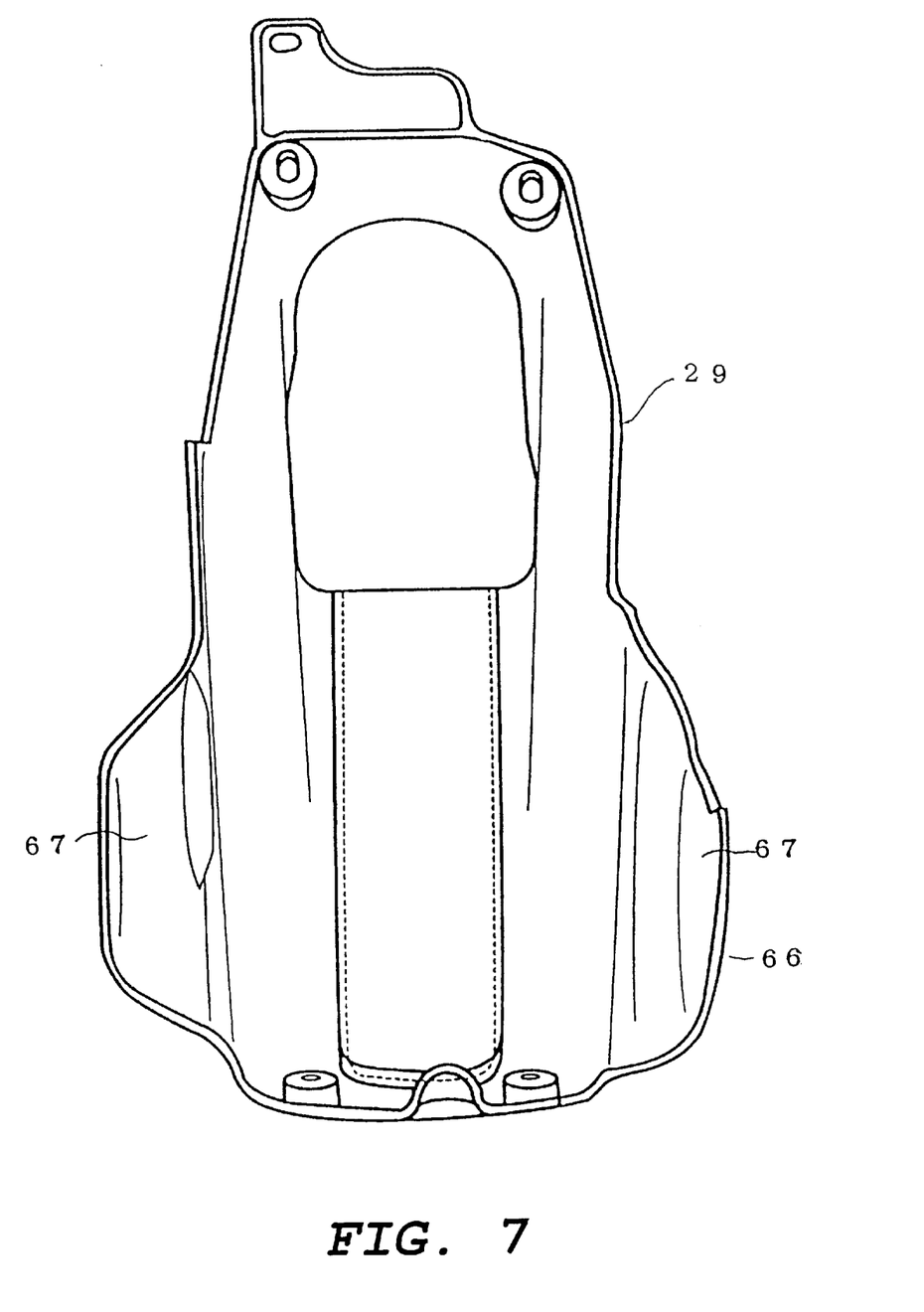
FIG. 7 is a plan view of a skid plate.

FIG. 7 is a plan view of the skid plate 29. Side walls 67 rising up from the left and right are provided on a front half side 66, and by respectively facing upwards and sloping to form an outwardly opening shape, a space for arranging the cooling water pump 60 and the reservoir tank 28 is formed inside the skid plate 29. Reference numeral 68 denotes a crank shaft.

Next, the operation of this invention will be described. As shown in FIG. 5, the cooling water pump 60 and the reservoir tank 28 are respectively arranged to the left and right of the crankcase 26, and since they are housed above the skid plate 29, it is possible to arrange the cooling water pump 60 and the reservoir tank 28 using the skid plate 29. As a result, the cooling water pump 60 and the reservoir tank 28 enable shortening of respective piping to the radiator 25, and it is possible to prevent weight increase by simplifying the piping. Also, by providing the reservoir tank 28 on the skid plate 29, that is by arranging the reservoir tank 28 at a lowest position where there are comparatively slight variations in the attitude of the vehicle, it is possible to reduce leakage, and protection using the skid plate can be anticipated even if it is made of a comparatively non-rigid material such as resin, and it is possible to make effective use of dead space.

Further, since the reservoir tank 28 usually maintains a substantially constant volume, there is only slight variation in fluid amount, and by arranging the reservoir tank 28 close to the crankcase 26, it is possible to concentrate the mass, achieve a low center of gravity, and reduce variations in the center of gravity. As well as this, it is possible to check the fluid amount at any time while traveling.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motorcycle having an engine arranged between front and rear wheels, an underneath of the engine being covered by a shield plate, in which a crankcase is arranged below the engine, a cylinder head projects outwards from the top of the crankcase, and a cooling device, said cooling device comprising:

a radiator disposed in front of the cylinder head;

a cooling water pump arranged on one side of the crankcase for causing circulation of cooling water for the engine;

a reservoir tank arranged close to the other side for cooling water, said reservoir tank being located below said radiator; and a skid plate covering at least front parts of the cooling water pump and the reservoir tank, wherein a space is formed between said skid plate and said crankcase, said cooling water pump is located within said space, and said reservoir tank is located within said space.

2. The motorcycle according to claim 1, wherein a frame of said motorcycle includes a joint member located approximately centrally within said space.

3. The motorcycle according to claim 2, wherein said cooling water pump is located at one lateral side of said joint member, and said reservoir tank is located at an opposite lateral side of said joint member.

4. The motorcycle according to claim 3, wherein said reservoir tank has a vertically extending portion, a horizontally extending portion, and a curved portion interconnecting said vertical portion and said horizontal portion.

5. The motorcycle according to claim 4, wherein said skid plate includes a pair of spaced-apart side walls rising up from left and right sides of the skid plate, said side walls facing upward and sloping to form an outwardly opening shape.

6. The motorcycle according to claim 5, wherein said reservoir tank includes a cap and an overflow pipe at a top end thereof, and a reservoir tube at a lower end thereof for connection with said radiator.

7. The motorcycle according to claim 1, wherein said skid plate includes a pair of spaced-apart side walls rising up from left and right sides of the skid plate, said side walls facing upward and sloping to form an outwardly opening shape.

8. The motorcycle according to claim 1, wherein said reservoir tank has a vertically extending portion, a horizontally extending portion, and a curved portion interconnecting said vertical portion and said horizontal portion.

9. The motorcycle according to claim 1, wherein said reservoir tank includes a cap and an overflow pipe at a top end thereof, and a reservoir tube at a lower end thereof for connection with said radiator.

10. A motorcycle comprising:

a frame;

an engine supported by said frame, said engine including a crankcase and a cylinder head;

a radiator disposed in front of said cylinder head;

a skid plate attached to the frame forwardly of said crankcase such that a space is formed between said skid plate and said crankcase;

a cooling water pump located within said space for circulating cooling water through said engine; and a reservoir tank located within said space and below said radiator for receiving cooling water therein;

said skid plate covering at least front parts of the cooling water pump and the reservoir tank.

11. The motorcycle according to claim 10, wherein said frame includes a joint member located approximately centrally within said space.

12. The motorcycle according to claim 11, wherein said cooling water pump is located at one lateral side of said joint member, and said reservoir tank is located at an opposite lateral side of said joint member.

13. The motorcycle according to claim 12, wherein said reservoir tank has a vertically extending portion, a horizontally extending portion, and a curved portion interconnecting said vertical portion and said horizontal portion.

14. The motorcycle according to claim 13, wherein said skid plate includes a pair of spaced-apart side walls rising up from left and right sides of the skid plate, said side walls facing upward and sloping to form an outwardly opening shape.

15. The motorcycle according to claim 14, wherein said reservoir tank includes a cap and an overflow pipe at a top end thereof, and a reservoir tube at a lower end thereof for connection with said radiator.

16. The motorcycle according to claim 10, wherein said reservoir tank includes a cap and an overflow pipe at a top end thereof, and a reservoir tube at a lower end thereof for connection with said radiator.

17. The motorcycle according to claim 10, wherein said reservoir tank has a vertically extending portion, a horizontally extending portion, and a curved portion interconnecting said vertical portion and said horizontal portion.

18. The motorcycle according to claim 10, wherein said skid plate includes a pair of spaced-apart side walls rising up from left and right sides of the skid plate, said side walls facing upward and sloping to form an outwardly opening shape.

19. The motorcycle according to claim 10, wherein said reservoir tank is formed of synthetic resin.

20. The motorcycle according to claim 10, wherein an uppermost portion of said reservoir tank is located below a lowermost portion of said radiator.

* * * * *